US006973414B2

(12) United States Patent
Kuo

(10) Patent No.: US 6,973,414 B2
(45) Date of Patent: Dec. 6, 2005

(54) COMPUTER COMPONENT OPERATING TEMPERATURE INSPECTING METHOD AND SYSTEM WITH DEADLOCK RECOVERY CAPABILITY

(75) Inventor: Jia-Shiung Kuo, Taipei (TW)

(73) Assignee: Inventec Corporation, (TW)

( * ) Notice: Subject to any disclaimer, the term of this patent is extended or adjusted under 35 U.S.C. 154(b) by 79 days.

(21) Appl. No.: 10/611,510

(22) Filed: Jun. 30, 2003

(65) Prior Publication Data

US 2004/0267491 A1 Dec. 30, 2004

(51) Int. Cl.[7] .............................................. G06F 11/30
(52) U.S. Cl. .................................................... 702/186
(58) Field of Search ............................... 702/186, 135;
714/25, 47, 30, 39, 26; 713/1; 361/90; 345/589;
123/492; 73/24; 700/300; 600/358; 324/315;
429/218; 369/44; 365/222

(56) References Cited

U.S. PATENT DOCUMENTS 5,414,648 A * 5/1995 Morgan et al. ............. 702/155

2004/0059903 A1 * 3/2004 Smith et al. .................... 713/1
2004/0153786 A1 * 8/2004 Johnson et al. ............... 714/25

* cited by examiner

Primary Examiner—Bryan Bui
Assistant Examiner—Tung Lau
(74) Attorney, Agent, or Firm—Fulbright & Jaworski LLP

(57) ABSTRACT

A computer component operating temperature inspecting method and system is proposed, which is designed for use with a computer component that is equipped with a built-in temperature detecting function and is based on a standardized bus architecture, such as SMBus (System Management Bus) and I2C (Inter Integrated Circuit) compliant SMBus/I2C bus architecture, for the purpose of inspecting the current operating temperature of the computer component via the bus architecture, and which is capable of, in the event of the computer component being subjected to a deadlock condition, restoring the computer component back to normal operation to allow the computer component's current operating temperature to be able to be inspected. This feature can help protect the computer component from being burned out due to overheat that is otherwise undetectable in the event of deadlock, thereby ensuring the operating reliability of the entire computer system.

6 Claims, 2 Drawing Sheets

COMPUTER COMPONENT OPERATING TEMPERATURE INSPECTING METHOD AND SYSTEM WITH DEADLOCK RECOVERY CAPABILITY

BACKGROUND OF THE INVENTION

1. Field of the Invention

This invention relates to computer system technology, and more particularly, to a computer component operating temperature inspecting method and system which is designed for use with a computer component, such as an IC device, that is equipped with a built-in temperature detecting function and is accessible via a standardized bus architecture, such as the SMBus (System Management Bus) and I2C (Inter Integrated Circuit) compliant bus architecture, for the purpose of inspecting the current operating temperature of the computer component via the bus architecture, and in the event of the computer component being subjected to a deadlock, restoring the computer component back to normal operation to allow the computer component's current operating temperature to be able to be inspected.

2. Description of Related Art

SMBus (System Management Bus) is a two-wire data communication interface developed by Intel Corporation based on the I2C (Inter Integrated Circuit) bus architecture from Fillips corporation, and which is widely utilized in personal computers and network servers as a low-speed data communication interface between the various components in the computer system, such as between keyboard controller (KBC) and each IC devices on the motherboard.

One application of the SMBus/I2C data communication interface is to allow the keyboard controller to inspect the operating conditions of all the IC devices that are connected to the SUBus/I2C data communication interface. For example, the keyboard controller can inspect via the SMBus/I2C data communication interface to inspect whether the current operating temperature of a certain IC device exceeds an upper limit; if YES, the keyboard controller will initiate a series of actions to protect the IC device from being burned out that would otherwise cause the entire computer system to halt down.

In practice, however, IC devices could be subjected to a deadlock condition during its operation, causing the external keyboard controller unable to gain access to any information about the IC device, including the information about the current operating temperature of the IC device, via the SMBus/I2C data communication interface. As a result, if the IC device is overheated during deadlock, the overheated condition would be undetectable by the keyboard controller, and therefore may cause the IC device to burn out and cause the entire computer system to halt down.

SUMMARY OF THE INVENTION

It is therefore an objective of this invention to provide a computer component operating temperature inspecting method and system which is capable of, in the event of a computer component being subjected to deadlock, restoring the computer component back to normal operation to allow the computer component's current operating temperature to be able to be inspected.

The computer component operating temperature inspecting method and system according to the invention is designed for use with a computer component that is equipped with a built-in operating temperature detecting function and is based on a specific bus architecture, for the purpose of inspecting the current operating temperature of the computer component via the bus architecture, and which is capable of, in the event of the computer component suffering from a deadlock, restoring the computer component back to normal operation to allow the computer component's current operating temperature to be able to be inspected.

The computer component operating temperature inspecting method and system is characterized by the method steps of: (1) issuing a temperature request signal via the bus architecture to the computer component to request the computer component to send back an operating temperature message that indicates the current operating temperature of the computer component; (2) counting for a prespecified length of duration promptly after the issuing of the temperature request signal; (3) at the elapse of the prespecified length of duration, checking whether an operating temperature message has been received via the bus architecture from the computer component; if NO, issuing a reset signal and send the reset signal via a dedicated signal line to the computer component for the purpose of resetting the computer component to reestablish link with the bus architecture; and (4) inspecting whether the linking between the bus architecture and the computer component is acknowledged; if YES, reissuing a temperature request signal via the bus architecture to the computer component to request the computer component to send back an operating temperature message that indicates the current operating temperature of the computer component.

The computer component operating temperature inspecting method and system according to the invention is characterized by that it is capable of performing deadlock recovery to the computer component so as to allow the computer component's current operating temperature to be able to be inspected, which can help protect the computer component from being burned out due to overheat that is otherwise undetectable in the event of deadlock, thereby ensuring the operating reliability of the entire computer system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer component operating temperature inspecting method and system according to the invention is disclosed in full details by way of preferred embodiments in the following with reference to the accompanying drawings.

Figure 1:
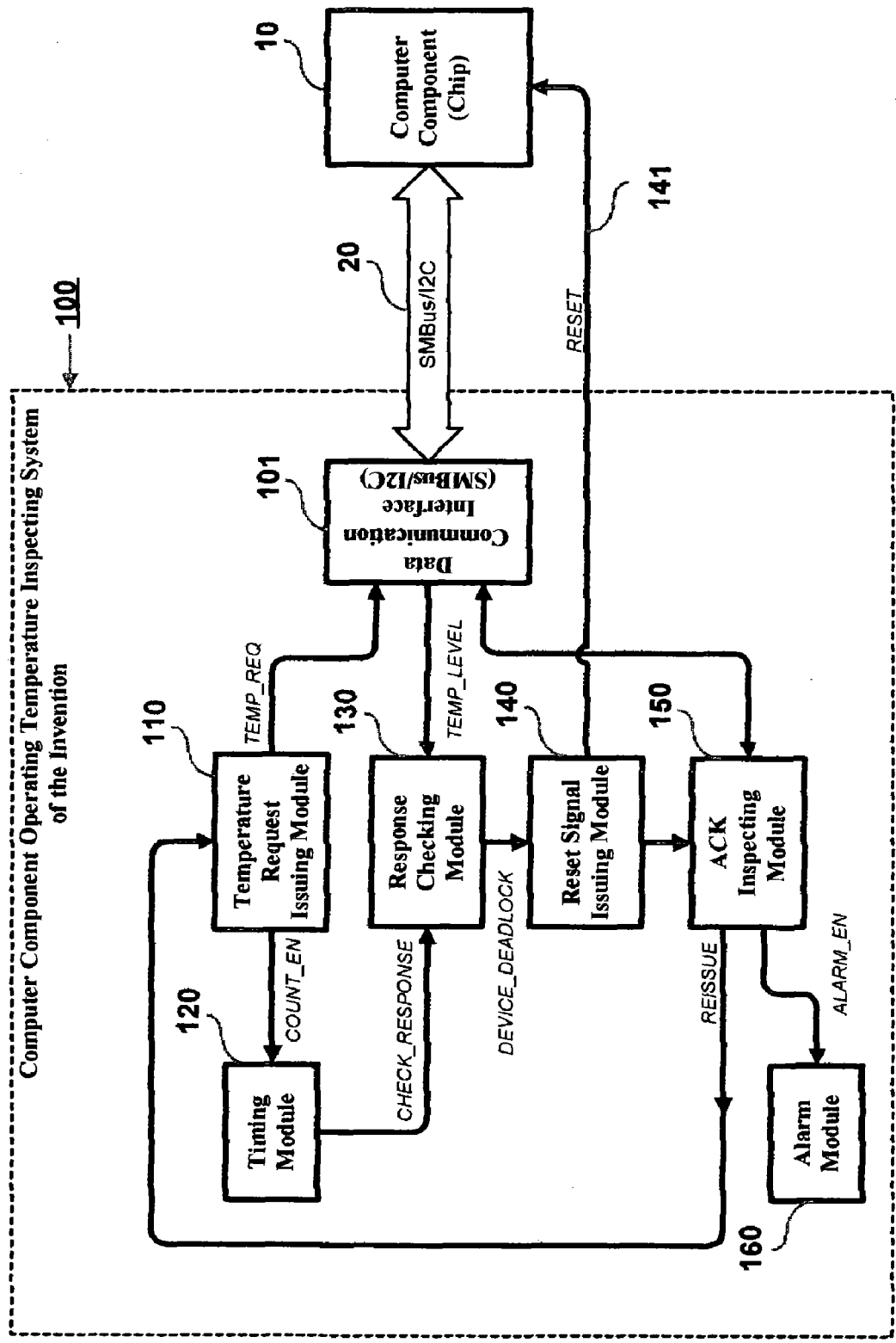
FIG. 1 is a schematic diagram showing an object-oriented component model of the computer component operating temperature inspecting system of the invention.

FIG. 1 is a schematic diagram showing the object-oriented component model of the computer component operating temperature inspecting system (as the part enclosed in the dotted box indicated by the reference numeral 100). As shown, in application, the computer component operating temperature inspecting system of the invention 100 is coupled via a standardized bus architecture 20, such as a to an SMBus (System Management Bus) and I2C (Inter Integrated Circuit) compliant bus architecture, to a computer component 10 that is equipped with a built-in temperature detecting function, for the purpose of inspecting the current operating temperature of the computer component 10 via the bus architecture 20, and which is capable of, in the event of the computer component 10 being subjected to deadlock, restoring the computer component 10 back to normal operation to allow the computer component's current operating temperature to be able to be inspected.

The object-oriented component model of the computer component operating temperature inspecting system of the invention 100 comprises: (a) a data communication interface 101; (b) a temperature request issuing module 110; (c) a timing module 120; (d) a response checking module 130; (e) a reset-signal issuing module 140; (f) an acknowledgement (ACK) inspecting module 150; and (g) an alarm module 160.

The data communication interface 101 is compliant with and connected to the SMBus/I2C bus architecture 20 to allow the computer component operating temperature inspecting system of the invention 100 to exchange messages with the computer component 10 via the SMBus/I2C bus architecture 20.

The temperature request issuing module 110 is capable of issuing a temperature request signal TEMP_REQ via the data communication interface 101 and the SMBus/I2C bus architecture 20 to the computer component 10 to request the computer component 10 to send back an operating temperature message TEMP_LEVEL that indicates the current operating temperature of the computer component 10. In addition, the temperature request issuing module 110 will issue a count-enable message COUNT_EN to the timing module 120 concurrently with the issuing of the temperature request signal TEMP_REQ.

The timing module 120 is capable of being activated in response to the count-enable message COUNT_EN from the temperature request issuing module 110 to register time by counting clock pulses for a prespecified length of duration, such as 10 seconds, and at the elapse of the prespecified length of duration, capable of issuing a check response request CHECK_RESPONSE to the response checking module 130.

The response checking module 130 is capable of being activated in response to the check response request CHECK_RESPONSE from the timing module 120 to check whether an operating temperature message TEMP_LEVEL has been received by the data communication interface 101 via the SMBus/I2C bus architecture 20 from the computer component 10; if NO, the response checking module 130 will promptly issue a deadlock message DEVICE_DEADLOCK to the reset-signal issuing module 140.

The reset-signal issuing module 140 is capable of being activated in response to the deadlock message DEVICE_DEADLOCK from the response checking module 130 to issue a reset signal RESET and send the reset signal RESET via a dedicated signal line 141 to the computer component 10, which will cause the computer component 10 to power off and then on to reset itself and thereby reestablish link with the SMBus/I2C bus architecture 20.

The acknowledgement inspecting module 150 is capable of being activated after the issuing of the reset signal RESET to inspect whether the linking between the data communication interface 101 and the computer component 10 via the SMBus/I2C bus architecture 20 is acknowledged (OK). If YES, the acknowledgement inspecting module 150 will issue a reissue request REISSUE to the temperature request issuing module 110 to request the temperature request issuing module 110 to reissue a temperature request signal TEMP_REQ via the SMBus/I2C bus architecture 20 to the computer component 10 to request the computer component 10 to send back an operating temperature message TEMP_LEVEL that indicates the current operating temperature of the computer component 10. On the other hand, if the linking is unacknowledged, it might indicate that computer component 10 has permanently failed or burned out; and therefore, it will cause the acknowledgement inspecting module 150 to issue an alarm-enable message ALARM_EN to the alarm module 160.

The alarm module 160 is capable of being activated in response to the alarm-enable message ALARM_EN from the acknowledgement inspecting module 150 to generate a human-perceivable alarm message, such as a warning beep or a flashing text string displayed on computer monitor, for the purpose of notifying system management personnel to perform necessary maintenance work on the computer component 10.

Figure 2:
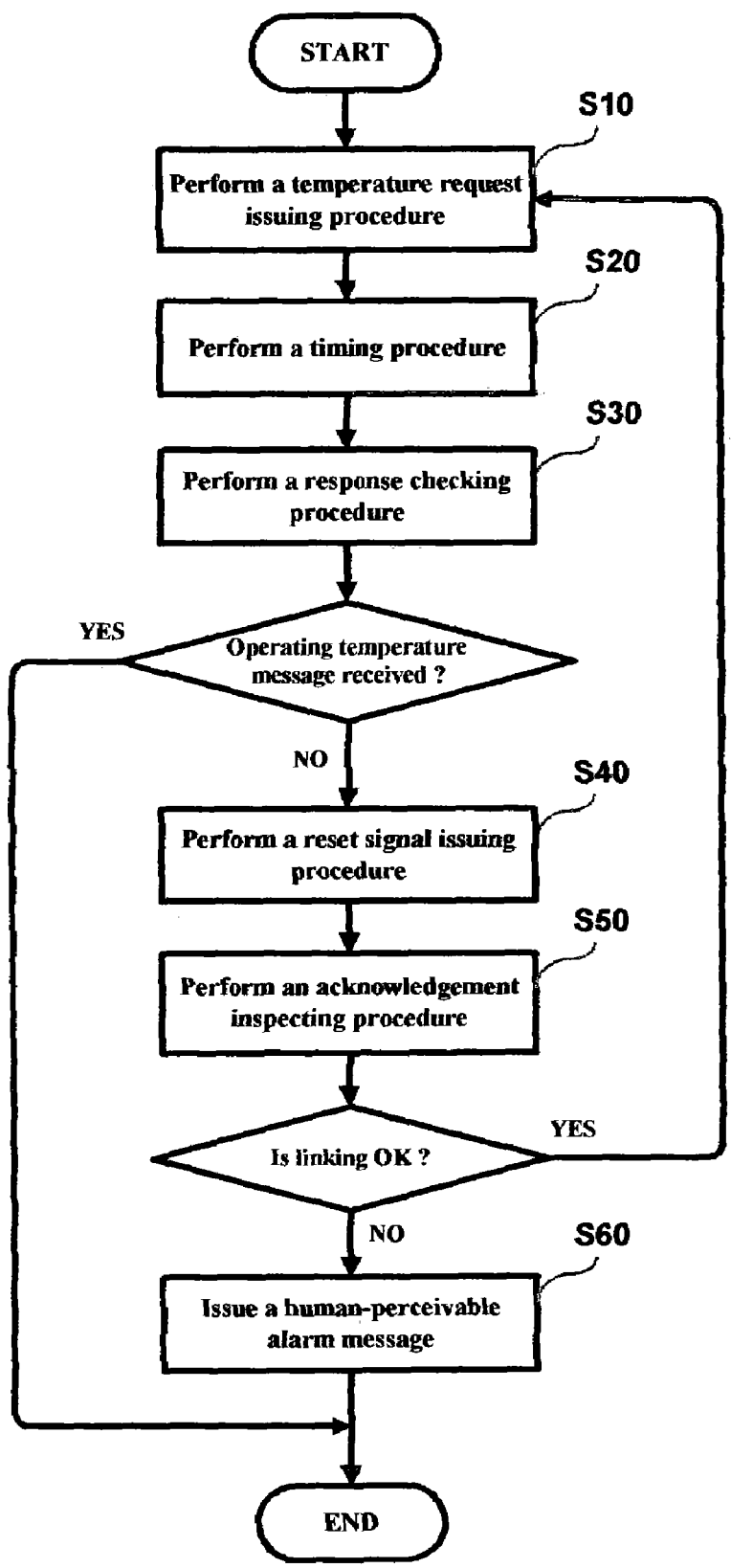
FIG. 2 is a flow diagram showing the method steps performed by the computer component operating temperature inspecting system of the invention.

FIG. 2 is a flow diagram showing the method steps performed by the computer component operating temperature inspecting system of the invention 100 during its operation with the computer component 10.

Referring to FIG. 2 together with FIG. 1, the first step S10 is to perform a temperature request issuing procedure, wherein the temperature request issuing module 110 is activated to issue a temperature request signal TEMP_REQ via the data communication interface 101 and the SMBus/I2C bus architecture 20 to the computer component 10 to request the computer component 10 to send back an operating temperature message TEMP_LEVEL that indicates the current operating temperature of the computer component 10; and in addition, the temperature request issuing module 110 issues a count-enable message COUNT_EN to the timing module 120 concurrently with the issuing of the temperature request signal TEMP_REQ.

The next step S20 is to perform a timing procedure, wherein the timing module 120 is activated in response to the count-enable message COUNT_EN from the temperature request issuing module 110 to register time for a prespecified length of duration, such as 10 seconds, and at the elapse of the prespecified length of duration, issue a check response request CHECK_RESPONSE to the response checking module 130.

The next step S30 is to perform a response checking procedure, wherein the response checking module 130 is activated in response to the check response request CHECK_RESPONSE from the timing module 120 to check whether an operating temperature message TEMP_LEVEL has been received by the data communication interface 101 via the SMBus/I2C bus architecture 20 from the computer component 10; If YES, the procedure is ended; whereas if NO, the response checking module 130 promptly issues a deadlock message DEVICE_DEADLOCK to the reset-signal issuing module 140, and the procedure then goes to the step S40.

The step S40 is to perform a reset-signal issuing procedure, wherein the reset-signal issuing module 140 is activated in response to the deadlock message DEVICE_DEADLOCK from the response checking module 130 to issue a reset signal RESET and transfer the reset signal RESET via a dedicated signal line 141 to the computer component 10, which will cause the computer component 10 to power off and then on to reset itself and thereby reestablish link with the SMBus/I2C bus architecture 20.

The next step S50 is to perform an acknowledgement inspecting procedure, wherein the acknowledgement inspecting module 150 is activated promptly after the issuing of the reset signal RESET to inspect whether the linking between the data communication interface 101 and the computer component 10 via the SMBus/I2C bus architecture 20 is acknowledged (OK). If NO, the procedure goes to the step S60; whereas if YES, the acknowledgement inspecting module 150 issues a reissue request REISSUE to the temperature request issuing module 110, and the procedure goes back to the step S10 wherein the temperature request issuing module 110 is activated in response to the reissue request REISSUE to reissue a temperature request signal TEMP_REQ via the SMBus/I2C bus architecture 20 to the computer component 10 to request the computer component 10 to send back an operating temperature message TEMP_LEVEL that indicates the current operating temperature of the computer component 10.

In the step S60, the alarm module 160 is activated in response to the alarm-enable message ALARM_EN from the acknowledgement inspecting module 150 to generate a human-perceivable alarm message, such as a warning beep or a flashing text string displayed on computer monitor for the purpose of notifying system management personnel to perform necessary maintenance work on the computer component 10.

In conclusion, the invention provides a computer component operating temperature inspecting method and system, which is designed for use with a computer component that is equipped with a built-in operating temperature detecting function and is based on a standardized bus architecture, such as SMBus/I2C-compliant bus architecture, for the purpose of inspecting the current operating temperature of the computer component via the bus architecture, and which is capable of, in the event of the computer component suffering from a deadlock, restoring the computer component back to normal operation to allow the computer component's current operating temperature to be able to be inspected. This feature can help protect the computer component from being burned out due to overheat that is otherwise undetectable in the event of deadlock, thereby ensuring the operating reliability of the entire computer system.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer component operating temperature inspecting method for use on a computer component that is equipped with a built-in temperature detecting function and is based on a standardized bus architecture, for the purpose of inspecting the current operating temperature of the computer component via the bus architecture, and which is capable of, in the event of the computer component being subjected to a deadlock condition, restoring the computer component back to normal operation to allow the computer component's current operating temperature to be able to be inspected;

the computer component operating temperature inspecting method comprising:

issuing a temperature request signal via the bus architecture to the computer component to request the computer component to send back an operating temperature message that indicates the current operating temperature of the computer component;

counting for a prespecified length of duration promptly after the issuing of the temperature request signal;

at the elapse of the prespecified length of duration, checking whether an operating temperature message has been received via the bus architecture from the computer component; if NO, issuing a reset signal and send the reset signal via a dedicated signal line to the computer component for the purpose of resetting the computer component to reestablish link with the bus architecture; and inspecting whether the linking between the bus architecture and the computer component is acknowledged; if YES, reissuing a temperature request signal via the bus architecture to the computer component to request the computer component to send back an operating temperature message that indicates the current operating temperature of the computer component; and wherein the bus architecture is an SMBus/I2C-compliant bus architecture.

2. The computer component operating temperature inspecting method of claim 1, further comprising:

generating a human-perceivable alarm message in the event that the linking between the computer component and the bus architecture is unable to be reestablished after the resetting of the computer component.

3. A computer component operating temperature inspecting system for use with a computer component that is equipped with a built-in temperature detecting function and is based on a standardized bus architecture, for the purpose of inspecting the current operating temperature of the computer component via the bus architecture, and which is capable of, in the event of the computer component being subjected to a deadlock condition, restoring the computer component back to normal operation to allow the computer component's current operating temperature to be able to be inspected;

the computer component operating temperature inspecting system comprising:

a data communication interface, which is compliant with and connected to the standardized bus architecture so as to exchange messages with the computer component via the bus architecture;

a temperature request issuing module, which is capable of issuing a temperature request signal via the data communication interface and the bus architecture to the computer component to request the computer component to send back an operating temperature message that indicates the current operating temperature of the computer component;

a timing module, which is capable of being activated to register time for a prespecified length of duration promptly after the issuing of the temperature request signal by the temperature request issuing module;

a response checking module, which is capable of being activated at the elapse of the prespecified length of duration to check whether an operating temperature message has been received by the data communication interface via the bus architecture from the computer component, and if NO, capable of generating a deadlock message;

a reset-signal issuing module, which is capable of being activated in response to the deadlock message from the response checking module to issue a reset signal and send the reset signal via a dedicated signal line to the computer component for the purpose of resetting the computer component to reestablish link with the bus architecture; and an acknowledgement inspecting module, which is capable of being activated promptly after the issuing of the reset signal to inspect whether the linking between the data communication interface and the computer component via the bus architecture is acknowledged, and if YES, capable of issuing a reissue request to the temperature request issuing module to request the temperature request issuing module to reissue a temperature request signal via the bus architecture to the computer component to request the computer component to send back an operating temperature message that indicates the current operating temperature of the computer component; and wherein the bus architecture is an SMBus/I2C-compliant bus architecture.

4. The computer component operating temperature inspecting system of claim 3, further comprising:

an alarm module, which is capable of generating a human-perceivable alarm message in the event that the acknowledgement inspecting module inspects that the linking between the computer component and the bus architecture is unable to be acknowledged after the resetting of the computer component.

5. A computer component operating temperature inspecting system for use with a computer component that is equipped with a built-in temperature detecting function and is based on an SMBus/I2C bus architecture, for the purpose of inspecting the current operating temperature of the computer component via the SMBus/I2C bus architecture, and which is capable of, in the event of the computer component being subjected to a deadlock condition, restoring the computer component back to normal operation to allow the computer component's current operating temperature to be able to be inspected;

the computer component operating temperature inspecting system comprising:

a data communication interface, which is compliant with and connected to the SMBus/I2C bus architecture so as to exchange messages with the computer component via the SMBus/I2C bus architecture;

a temperature request issuing module, which is capable of issuing a temperature request signal via the data communication interface and the SMBus/I2C bus architecture to the computer component to request the computer component to send back an operating temperature message that indicates the current operating temperature of the computer component;

a timing module, which is capable of being activated to register time for a prespecified length of duration promptly after the issuing of the temperature request signal by the temperature request issuing module;

a response checking module, which is capable of being activated at the elapse of the prespecified length of duration to check whether an operating temperature message has been received by the data communication interface via the SMBus/I2C bus architecture from the computer component, and if NO, capable of generating a deadlock message;

a reset-signal issuing module, which is capable of being activated in response to the deadlock message from the response checking module to issue a reset signal and send the reset signal via a dedicated signal line to the computer component for the purpose of resetting the computer component to reestablish link with the SMBus/I2C bus architecture; and an acknowledgement inspecting module, which is capable of being activated promptly after the issuing of the reset signal to inspect whether the linking between the data communication interface and the computer component via the SMBus/I2C bus architecture is acknowledged, and if YES, capable of issuing a reissue request to the temperature request issuing-module to request the temperature request issuing module to reissue a temperature request signal via the SMBus/I2C bus architecture to the computer component to request the computer component to send back an operating temperature message that indicates the current operating temperature of the computer component.

6. The computer component operating temperature inspecting system of claim 5, further comprising:

an alarm module, which is capable of generating a human-perceivable alarm message in the event that the acknowledgement inspecting module inspects that the linking between the computer component and the SMBus/I2C bus architecture is unable to be acknowledged after the resetting of the computer component.

* * * * *